United States Patent
Dix

(10) Patent No.: US 9,946,367 B2
(45) Date of Patent: *Apr. 17, 2018

(54) INPUT DEVICE FOR TOUCH-SENSITIVE CAPACITIVE DISPLAYS

(71) Applicant: STAEDTLER MARS GMBH & CO. KG, Nürnberg (DE)

(72) Inventor: Rilke Dix, Bamberg (DE)

(73) Assignee: STAEDTLER MARS GMBH & CO. KG, Nürnberg (DE)

(*) Notice: Subject to any disclaimer, the term of this patent is extended or adjusted under 35 U.S.C. 154(b) by 0 days.

This patent is subject to a terminal disclaimer.

(21) Appl. No.: 14/404,813

(22) PCT Filed: May 4, 2013

(86) PCT No.: PCT/EP2013/001319
§ 371 (c)(1),
(2) Date: Dec. 1, 2014

(87) PCT Pub. No.: WO2013/178317
PCT Pub. Date: Dec. 5, 2013

(65) Prior Publication Data
US 2015/0261325 A1  Sep. 17, 2015

(30) Foreign Application Priority Data

May 29, 2012  (DE) .................. 10 2012 010 966

(51) Int. Cl.
*G06F 3/041* (2006.01)
*G06F 3/0354* (2013.01)
(Continued)

(52) U.S. Cl.
CPC ......... *G06F 3/03545* (2013.01); *A45D 40/20* (2013.01); *B43K 19/02* (2013.01);
(Continued)

(58) Field of Classification Search
CPC ........ A45D 40/20; B43K 19/02; B43K 29/00; B43K 23/00; B43K 25/00; B43K 29/02;
(Continued)

(56) References Cited

U.S. PATENT DOCUMENTS 6,168,732 B1 * 1/2001 Ardakani ............... C08G 61/02
252/500
8,188,175 B2   5/2012 Lins et al.
(Continued)

FOREIGN PATENT DOCUMENTS

AT       412627 B    5/2005
CH       696636 A5   8/2007
(Continued)

OTHER PUBLICATIONS

Bright Side, 26 Brilliant Ideas to Use Everyday Items in a Completely Different Way, https://www.wimp.com/26-brilliant-ideas-to-use-everyday-items-in-a-completely-different-way/8/?utm_source=fba&utm_medium=cpc&utm_campaign=traffic2/ Aug. 2017, pp. 10 and 11.*

*Primary Examiner* — Nelson Rosario
(74) *Attorney, Agent, or Firm* — Lucas & Mercanti, LLP; Klaus P. Stoffel

(57) ABSTRACT

An input device for capacitive, touch-sensitive displays, wherein the device is a simple pen, wherein the simple pen can be sharpened, wherein the device is present as a core, or wherein the device is present as a core with a coating, or wherein the device is present as core with a casing, or wherein the device includes a core, a casing and a coating, and wherein the core, the casing and/or the coating are configured so as to be electrically conductive.

6 Claims, 1 Drawing Sheet

(51) Int. Cl.
*G06F 3/039* (2013.01)
*G06F 3/044* (2006.01)
*A45D 40/20* (2006.01)
*B43K 19/02* (2006.01)
*B43K 29/00* (2006.01)

(52) U.S. Cl.
CPC .............. *B43K 29/00* (2013.01); *G06F 3/039* (2013.01); *G06F 3/041* (2013.01); *G06F 3/044* (2013.01)

(58) Field of Classification Search
CPC ..... B43K 29/08; B43K 31/00; G06F 3/03545; G06F 3/039; G06F 3/041; G06F 3/044; G09G 3/3607; G09G 2320/0242; G09G 3/3648
USPC ........ D11/411; D19/115–186, 190–204, 904, D19/908, 918; 24/11 F, 11 P, 11 R; 401/52, 99, 192, 195, 196; 345/173–184; 178/18.01–20.04
See application file for complete search history.

(56) References Cited

U.S. PATENT DOCUMENTS

2006/0018936 A1  1/2006  Appel et al.
2009/0076770 A1* 3/2009  Fukushima ......... G06F 3/03545
                                                    702/150
2011/0164000 A1* 7/2011  Pance .................. G06F 3/03545
                                                    345/179
2011/0249007 A1* 10/2011 Kuster .................. G06T 11/203
                                                    345/441
2012/0086664 A1* 4/2012  Leto .................... G06F 3/03545
                                                    345/174
2013/0249870 A1* 9/2013  Slaby .................. G06F 3/03545
                                                    345/179
2014/0044470 A1* 2/2014  Jewson .................. B43K 29/00
                                                    401/195

FOREIGN PATENT DOCUMENTS

| DE | 2203635 A1 | 10/1972 |
| DE | 102005004176 A1 | 7/2006 |
| DE | 202005021251 U1 | 7/2007 |
| DE | 202008009751 U1 | 8/2009 |
| DE | 102008034013 A1 | 1/2010 |
| EP | 1585016 A1 | 10/2005 |
| GB | 418502 A | 10/1934 |
| GB | 1363161 A | 8/1974 |
| WO | 2011008533 A2 | 1/2011 |

* cited by examiner

INPUT DEVICE FOR TOUCH-SENSITIVE CAPACITIVE DISPLAYS

The present application is a 371 of International application PCT/EP2013/001319, filed May 4, 2013, which claims priority of DE 10 2012 010 966.0, filed May 29, 2012, the priority of these applications is hereby claimed and these applications are incorporated herein by reference.

BACKGROUND OF THE INVENTION

The invention relates to an input device for so-called capacitive touch-sensitive displays, and to the use thereof.

Input devices for displays of this kind are known in principle.

For example, input styluses are known, which consist of an electrically conductive shaft, wherein a soft, conductive, elastically formed contact plug for the display/display surface is formed at one end thereof.

With such input pens it is disadvantageous that they are too expensive for use as purely an input pen and moreover, do not have a writing or application function.

Further, input pens are known, which at one end comprise a writing utensil or applicator and at the other end, an electrically conductive arrangement in the form of a contact plug, which when the capacitive display is touched permits or triggers an input function.

The known input pens mentioned above, however, have a number of disadvantages.

For example, the manufacture of such pens is expensive. Almost all of these input pens according to the state of the art are present as ball point pens, which means that the user has not much to choose from.

SUMMARY OF THE INVENTION

It is therefore the requirement of the invention to propose an input device which does not have the disadvantages mentioned in the beginning and moreover, can be manufactured at very reasonable cost.

Furthermore it is a requirement of the invention that the input device continues to be available to users in the accustomed way as a fully-fledged writing, drawing, painting or cosmetics device and does not comprise any additional elements for triggering an input function.

The input device according to the invention is present as a simple writing, drawing, painting, cosmetics or erasing device which can be sharpened and which consists of at least one core for producing markings or for removing markings etc.

The devices encompassed thereby may be, for example, solid core pens or cores encased in wood, plastic and/or a wood substitute (WPC). The core may be present as a lead, color, cosmetics or eraser core.

Further, it is unimportant whether the solid core pen or the encased core additionally comprises a coating or alternative decorative top layer, for example in the form of a foil.

Surprisingly it was found to be possible to use such a simply constructed and cost-effective device as an input device if the core material and/or the core casing and/or the coating of the sharpenable device is/are configured so as to be conductive by adding conductive constituents or additives to the core, the core casing and/or the coating.

Sharpenable devices, as described above, are understood to include devices, which the user can sharpen or resharpen using a commercially available sharpener, a manual sharpener or other sharpening device in order to maintain their usefulness.

With devices with a core encased in wood substitute the wood substitute may consist of a plastic or so-called wood plastic compound (WPC). Such devices or casings are manufactured by an extrusion or co-extrusion or injection molding process.

The device may also comprise a core which is not color-releasing. The core may, for example, be a so-called eraser pen consisting of a solid erasing core or core/strand with a casing. In this case too, the erasing material and/or casing is mixed with substances/additives as already mentioned, whereby the erasing material comprises conductive properties. Using the eraser core has the additional advantage that the erasing material, when it contacts the display, leaves no markings on the same. A comfortable soft contacting of the display is possible, since the erasing material is configured to be soft and smooth.

As mentioned, the core and/or core casing and/or coating must be implemented so as to be conductive, as described below by way of example.

In this respect it is mentioned that the pen according to the invention can be used for triggering an input function using either the tip or the end opposite the tip. If the input function is to be triggered with the tip, the tip must be configured to be conductive since only the tip touches the display. In this way a very precise input function is achieved.

At the end opposite the tip of the input device a gliding lacquer may be applied so that the input device can glide softly over the display. The gliding lacquer can be configured to be conductive, but this is not mandatory. In case of conductivity non-conductive areas are bridged, so that the function of the angle of attack/positional angle of the input device relative to the display becomes independent.

The gliding lacquer should be regarded as a coating which on sharpenable writing devices is known as a so-called protective cap.

The core, the casing and/or the coating are made conductive by the addition of certain additives. These additives comprise an intrinsic electric conductivity.

Examples of such additives are graphite, carbon fiber, conductive soot, metal fibers, "carbon nano tubes", copper pigments, silver-plated copper pigments and/or silver powder.

In order to render the core, the casing, the coating and/or the elements conductive, so-called anti-static agents may be added to the materials thereof. Antistatic agents have the effect of preventing or weakening the static charge of objects. In this respect a difference must be made between internal and external anti-static agents.

Such agents may, for example, be incorporated internally as metal wires or deposited externally as a metal powder by vaporization.

An example for a conductive casing is a conductive wood substitute, known as wood plastic compound (WPC) from the DE 102008034013 A1 (state-of-the-art), and which can be made conductive through the addition of graphite powder in an amount of 5 to 50 percent by weight, preferably at least 10 to 40 percent by weight. The wood substitute material according to the state of the art is made up of the following constituents:

15-30 percent by weight of at least one polymeric binding agent,
50-80 percent by weight of at least one organic filler,
0-20 percent by weight of at least one inorganic filler,
0.5-5 percent by weight of at least one bonding agent, 1-30 percent by weight of at least one wax
0-10 percent by weight of at least one color pigment and
0-10 percent by weight of at least one inorganic additive An actual exemplary embodiment for the wood substitute based on polyolefin is composed as follows:
60 percent by weight wood flour
12 percent by weight graphite
4 percent by weight wax (amid wax)
2 percent by weight inorganic additive (stearic acid)
21 percent by weight polyolefin
1 percent by weight bonding agent (polypropylene grafted with maleic anhydride.

Surprisingly it was found to be convenient that the addition of the conductive additive did not limit the sharpening capability with commercially available sharpeners. A so-called sharpening moment of less than 10 Ncm was maintained.

All customary properties of known so-called wood encased pens are upheld without restrictions.

If instead of WPC a pure plastic is used as encasing material the plastic also has to have a conductive additive added to it.

Standard plastics have an electrical resistivity of approx. $10^{14}$ ohm. By adding additives in order to achieve conductivity this value can be lowered down to $10^2$ ohm.

A conductive plastic is, for example, the commercial product called GraviTech GRV PP-030-IO Black FD by Messrs. POLYONE.

The cores may be implemented as lead, color, eraser or cosmetic cores or chalks.

A conductive lead core as known to the expert from the state of the art may consist of the following:

| | |
|---|---|
| Graphite | 50% by weight |
| Clay | 40% by weight |
| Additive | 1% by weight |
| Impregnation | 9% by weight |

As an example a polymer-bound graphite core shall also be mentioned such as used, for example, in commercially available solid core pens.

| | |
|---|---|
| Graphite | 70% by weight |
| Polymer (PS) | 20% by weight |
| Additive | 1% by weight |
| Wax | 9% by weight |

As an example for a conductive blue color core the following composition may be mentioned. In this case silver-plated copper pigments are the conductive additive.

| | |
|---|---|
| 1.5% by weight | pigment blue |
| 39% by weight | boron nitride |
| 16% by weight | silver-plated copper pigments |
| 5% by weight | calcium stearate |
| 7% by weight | stearic acid |
| 5% by weight | carboxymethyl cellulose |
| 8% by weight | mica |
| 16.5% by weight | soapstone |

In order to make conventional eraser cores or eraser tips conductive these may have graphite added to them.

A general formula for a conductive eraser compound may be, for example:

| | |
|---|---|
| Polymer | 15 to 90% by weight |
| Inorganic fillers | 0 to 80% by weight |
| Oils | 0 to 10% by weight |
| Graphite | 10 to 50% by weight |

The polymers used in this case may be from SEBS, SBS, EPDM/PP or mixtures therefrom, and/or with polyolefins, acrylates or PUR.

Classic fillers are chalk, talcum and/or kaolin.

As an example for a conductive cosmetics core an eyeliner core may be mentioned, which is composed of:

| | |
|---|---|
| 8% by weight | lithium stearate |
| 20% by weight | isopropyl myristate |
| 11% by weight | hydrogenated palm kernel glycerides |
| 45% by weight | pigment blue |
| 0.5% by weight | pantenol |
| 0.5% by weight | propylparaben |
| 15% by weight | silver powder. |

This formula is a modified formula according to the DE 202005021251 U1, wherein conductivity was achieved by adding/incorporating silver powder.

Coatings are understood to be thin color or lacquer coatings or thin foil coatings which mainly serve decorative or surface-sealing purposes.

An example for a conductive coating of lacquer has the following constituents:

| | |
|---|---|
| Nitrocellulose | 18% by weight |
| Softener | 6% by weight |
| Resins | 6% by weight |
| Acrylate | 6% by weight |
| Graphite | 12% by weight |
| Anorganic fillers | 20% by weight |
| Organic additives | 0.5% by weight |
| Solvent (VOC) | rest of 100% by weight. |

Foil coatings also can possess or comprise conductivity. As an example the product called "Alufin" by Messrs Kurz may be mentioned. This is an embossing foil metallized with aluminum.

Surprisingly it was also found that between the conductively implemented core, casing and/or coating and the hand of the user, there need not be any direct contacting or uninterrupted conductive transition. It is perfectly possible to have a line break in the form of a dielectric, wherein a sort of capacitor element is formed which produces a sufficiently large charge displacement when the user contacts the display with the input device in order to trigger an input function on the tablet.

As an example an input device may be mentioned in this respect, in which both core and casing are conductive, but the thin lacquer coating is not. The input function is effective without restriction.

The invention will now be explained in detail with reference to the FIGS. 1 to 3.

DETAILED DESCRIPTION OF THE INVENTION

Figure 1:
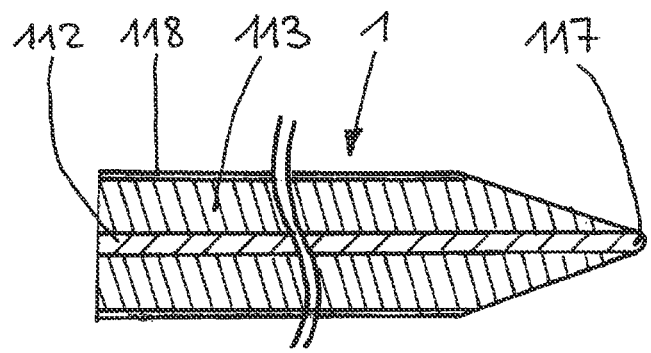
FIG. 1: Input device consisting of a core with a core casing as well as a coating.

FIG. 1 shows an input device 1, which comprises a core 112 with a core casing 113 and a coating 118. In the embodiment shown the casing 113 and the core 112 are configured so as to be electrically conductive. The thin coating 118 may, but need not be, configured to be electrically conductive. In case the coating 118 is not configured to be electrically conductive, a capacitor/dielectric is formed, for an application not shown, between the hand of the user and the input device 1. Since with thin coatings 118 the capacity is very high, the charge displacement when contacting the tablet is sufficient for achieving or triggering an input function.

Since in this embodiment the core 112 and thus also the tip 117 are configured to be conductive, an input function can be triggered at the tablet both via the tip 117 and via the end opposite the tip.

Figure 2:
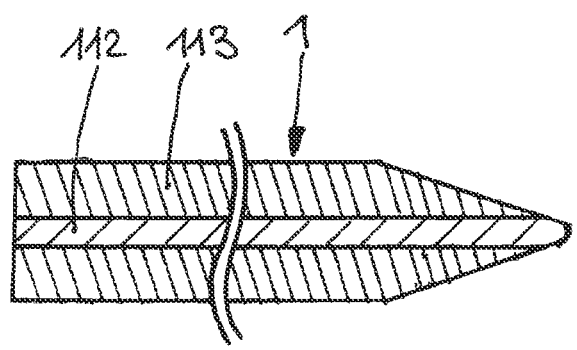
FIG. 2: Input device consisting of a core and a core casing.

FIG. 2 shows and describes an alternative implementation of an input pen 1 which comprises a core 112 with a casing 113.

Figure 3:
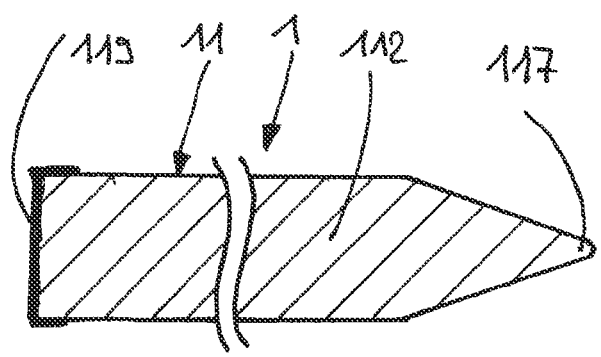
FIG. 3: Input device consisting of a core.

FIG. 3 shows an input device 1, which is configured as a solid core pen 11. The core 112 in this embodiment extends across the entire cross-section of the pen 11.

For an application not shown, the user contacts the surface of the tablet with the input device and thus establishes an electrically conductive connection between the tablet and the hand of the user. This leads to a charge displacement thereby triggering an input function on the tablet or tablet-PC.

At the end opposite the tip 117 a gliding lacquer layer 119 has been applied which in this embodiment is configured not to be conductive.

These input devices are intended for use on capacitive, touch-sensitive displays of so-called tablet computers or smart phones. The device is a simple pen, wherein the simple pen can be sharpened, wherein the device is present as a core, or wherein the device is present as a core with a coating, or wherein the device is present as core with a casing, or wherein the device comprises a core, a casing an a coating. The core, the casing and/or the coating are configured so as to be electrically conductive.

The core, the casing, and/or the coating comprise conductive constituents or additives, wherein these additives are present in the form of graphite, carbon fiber, conductive soot, metal fibers, "carbon nano tubes", copper pigments silver-plated copper pigments and/or silver powder.

ITEM LIST

1 Input device
11 simple pen
112 core
113 casing
117 tip
118 coating
119 gliding lacquer

The invention claimed is:

1. An input device for a capacitive touch-sensitive display, wherein the device is a sharpenable stylus sharpenable by a conventional pencil sharpener, wherein the device consists essentially of: a lead core encased in a non-conductive wood casing to form a pencil, wherein the lead core is electrically conductive; and a line break between the conductive core and a user's hand, wherein the line break is a dielectric, the stylus having a first tip end where the lead forms a tip for writing on a surface and a second end opposite the tip end, the lead core extending from the tip end to the second end so that both the lead tip and the second end of the stylus provide an input function to the capacitive display.

2. The device according to claim 1, wherein the casing is made of plastic and/or wood substitute.

3. The device according to claim 1, wherein the core comprises conductive constituents or additives, wherein the additives are at least one of the group consisting of: graphite, carbon fiber, conductive soot, metal fibers, carbon nano tubes, copper pigments, silverplated copper pigments and/or silver powder.

4. The device according to claim 1, wherein the core, the casing and/or a coating comprise anti-static agents as additives.

5. The device according to claim 4, wherein the coating is a color layer or a foil layer.

6. A method for activating a location on a capacitive touch-sensitive display, comprising the steps of:
providing an input device according to claim 1; and
activating a location on the capacitive, touch sensitive display by contacting the location with the input device.

* * * * *